US008607297B2

(12) United States Patent
Kummer et al.

(10) Patent No.: US 8,607,297 B2
(45) Date of Patent: Dec. 10, 2013

(54) REMOTE SETTING OF RECORDING TIMERS

(75) Inventors: David A. Kummer, Highlands Ranch, CO (US); Mark W. Jackson, Littleton, CO (US); Michael T. Dugan, Parker, CO (US); Daniel J. Minnick, Littleton, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 1933 days.

(21) Appl. No.: 10/940,078

(22) Filed: Sep. 13, 2004

(65) Prior Publication Data

US 2005/0097607 A1  May 5, 2005

Related U.S. Application Data

(60) Provisional application No. 60/509,065, filed on Sep. 11, 2003.

(51) Int. Cl.
 *H04N 7/16* (2011.01)
(52) U.S. Cl.
 USPC ............... 725/142; 725/58; 725/89; 386/83
(58) Field of Classification Search
 USPC ........... 725/52, 55, 58, 91, 134, 110, 139, 89, 725/142; 386/83
 See application file for complete search history.

(56) References Cited

U.S. PATENT DOCUMENTS

| | | | | |
|---|---|---|---|---|
| 5,805,763 A * | 9/1998 | Lawler et al. | | 386/296 |
| 5,982,411 A * | 11/1999 | Eyer et al. | | 725/49 |
| 6,614,987 B1 * | 9/2003 | Ismail et al. | | 386/83 |
| 6,772,433 B1 * | 8/2004 | LaJoie et al. | | 725/52 |
| 7,096,486 B1 * | 8/2006 | Ukai et al. | | 725/58 |
| 7,174,512 B2 * | 2/2007 | Martin et al. | | 715/719 |
| 2002/0046407 A1 * | 4/2002 | Franco | | 725/110 |
| 2002/0129375 A1 * | 9/2002 | Kim et al. | | 725/100 |
| 2003/0106064 A1 * | 6/2003 | Plourde, Jr. | | 725/91 |
| 2003/0106071 A1 * | 6/2003 | Akamatsu et al. | | 725/139 |
| 2003/0126607 A1 * | 7/2003 | Phillips et al. | | 725/55 |
| 2003/0145335 A1 * | 7/2003 | Oka | | 725/134 |
| 2004/0073947 A1 * | 4/2004 | Gupta | | 725/134 |
| 2004/0133923 A1 * | 7/2004 | Watson et al. | | 725/134 |
| 2005/0028208 A1 * | 2/2005 | Ellis et al. | | 725/58 |
| 2005/0160282 A1 * | 7/2005 | Hirata | | 713/189 |
| 2006/0045477 A1 * | 3/2006 | Moors et al. | | 386/83 |
| 2006/0212908 A1 * | 9/2006 | Hunter et al. | | 725/70 |

* cited by examiner

*Primary Examiner* — Brian Pendleton
*Assistant Examiner* — Alan Luong
(74) *Attorney, Agent, or Firm* — Ingrassia Fisher & Lorenz, P.C.

(57) ABSTRACT

The present invention provides a method and apparatus to have a pay television distributor set timers for the user. The timers record programs either requested by the user or by the pay television distributor.

27 Claims, 4 Drawing Sheets

US 8,607,297 B2

REMOTE SETTING OF RECORDING TIMERS

CROSS-REFERENCE TO RELATED APPLICATIONS

This application claims priority to U.S. Provisional Application Ser. No. 60/509,065, filed Sep. 11, 2003.

FIELD OF THE INVENTION

The present invention relates to television receiving devices that can record television programming. In particular, the invention relates to setting recording timer on television converters. The recording timers are set by a pay television distributor to record programs for a subscriber.

BACKGROUND OF THE INVENTION

The prior art includes various devices that can receive television signals. These television receiving devices, sometimes called set-top-boxes or television converters, may be provided to subscribers of a pay television service. A pay television service involves a pay television distributor transmitting a television signal to a group of subscribers. Examples of pay television distributors include, but are not limited to, cable and satellite television distributors.

Television converters may allow the subscribers to receive a pay television signal. Some television converters may allow the subscriber to record programs for later viewing. These television converters are often referred to as digital video recorders (DVRs). In some of these recorders, the user may set a recording timer. A recording timer permits a user to schedule a time for the DVR to record a program in the future. The user, however, must be in proximity to the DVR in order to set a recording timer.

BRIEF SUMMARY OF THE INVENTION

The present invention provides a method and apparatus to permit a pay television distributor to set timers for a user. The timers record programs that may be requested by the user or by the pay television distributor. Other features and advantages of the present invention will be described below in a detailed description of certain embodiments of the invention. These embodiments are illustrative and do not set out the full scope of the invention which is defined in the claims.

Figure 1:
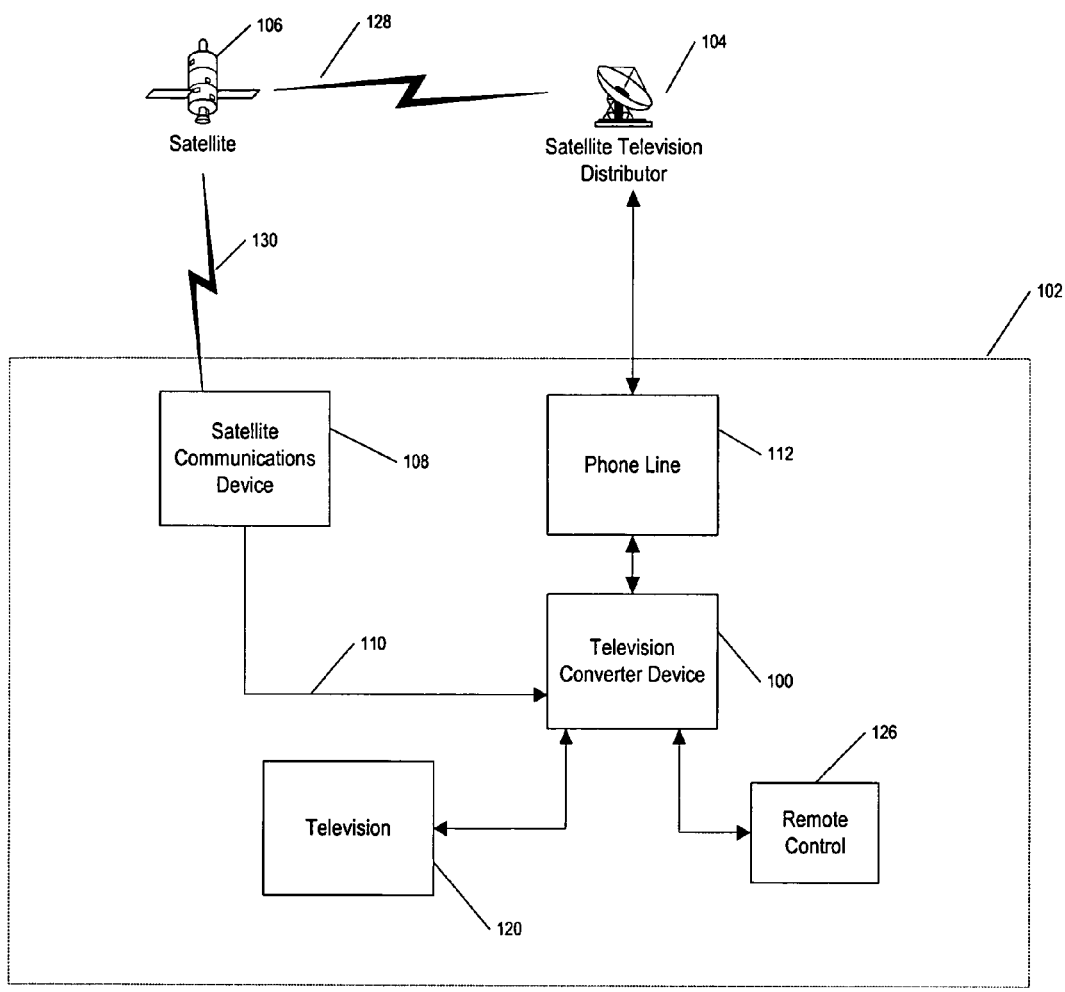
FIG. 1 shows an embodiment of a home entertainment system using a television converter.

For clarification, the drawings use a nomenclature for reference numerals that has two parts. The first part of the reference numeral is the drawing number, and it is followed by the second part, a two digit identifier (drawing 1 uses 1xx; drawing 3 uses 3xx). For example, two reference numerals in drawing 1 may be "102" and "104." A reference numeral in one drawing may be referred to in subsequent drawings; the same reference numeral in later drawings refers to the same item.

DETAILED DESCRIPTION OF THE INVENTION

In this specification, the present invention will be described using methods and systems related to subscriber satellite television service. This specific description is not meant to limit the invention to that one embodiment. The present invention may also be applicable to cable television systems, broadcast television systems or other television systems. The present invention is also described in terms of digital video recording (DVR) devices. The present invention may also be applicable to digital-versatile-disc (DVD) recording devices or other television recording devices. One skilled in the art will recognize that the present invention can apply elsewhere.

As a general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "television converter," "receiver," "set-top-box," "television receiving device," "television receiver," "television recording device," "satellite set-top-box," "satellite receiver," "cable set-top-box," "cable receiver," and "television tuner" to refer interchangeably to a converter device or electronic equipment that has the capacity to acquire, process and distribute one or more television signals transmitted by broadcast, cable, telephone or satellite distributors. "Digital video recorder (DVR)" and "personal video recorder (PVR)" refer interchangeably to devices that can digitally record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external set-top-box connected via cabling to a television). A further example of an external television converter device is the EchoStar Dish PVR 721, Part Number 106525, combination satellite set-top-box and PVR. For the remainder of this disclosure, specific embodiments will be described using a television converter device that implements satellite technology.

Finally, as a general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel."

The term "channel," as used in this description, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite set-top-box since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity.

Thus, in satellite television service a channel may not be the same as in broadcast television service. Rather, channels may be more properly termed service providers in satellite television service. The term "channel" will be used in this description to describe the service providers and the virtual channels they may occupy.

FIG. 1 presents an embodiment of a home entertainment system 102 that includes a television converter device 100 in the form of a satellite set-top-box. Generally, the satellite set-top-box 100 may receive one or more television signals from a cable television distributor (not shown), from a broadcast television distributor (not shown) or from a satellite television distributor 104. As a preferred embodiment, home entertainment system 102 receives signals from satellite television distributor 104. One skilled in the art will recognize that set-top-box 100 may also receive video-digital subscriber line (DSL), DSL, Internet, wireless and other signals from content or video distributors. The satellite set-top-box 100 may process television signals and may send the processed signals to peripheral electronic devices, such as a television 120 and remote control 126. The satellite set-top-box 100 also may accept commands from a remote control 126 or other peripheral electronic devices. More detail about the functionality of the satellite set-top-box 100 is provided below.

To further describe the home entertainment system, embodiments relating to receiving satellite television signals will be explained in more detail. A satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 Mhz.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible.

The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the television converter device 100 via cabling. One skilled in the art will recognize that other methods and other systems of delivering the satellite signal 110 to the satellite set-top-box 100 may be possible.

Figure 2:
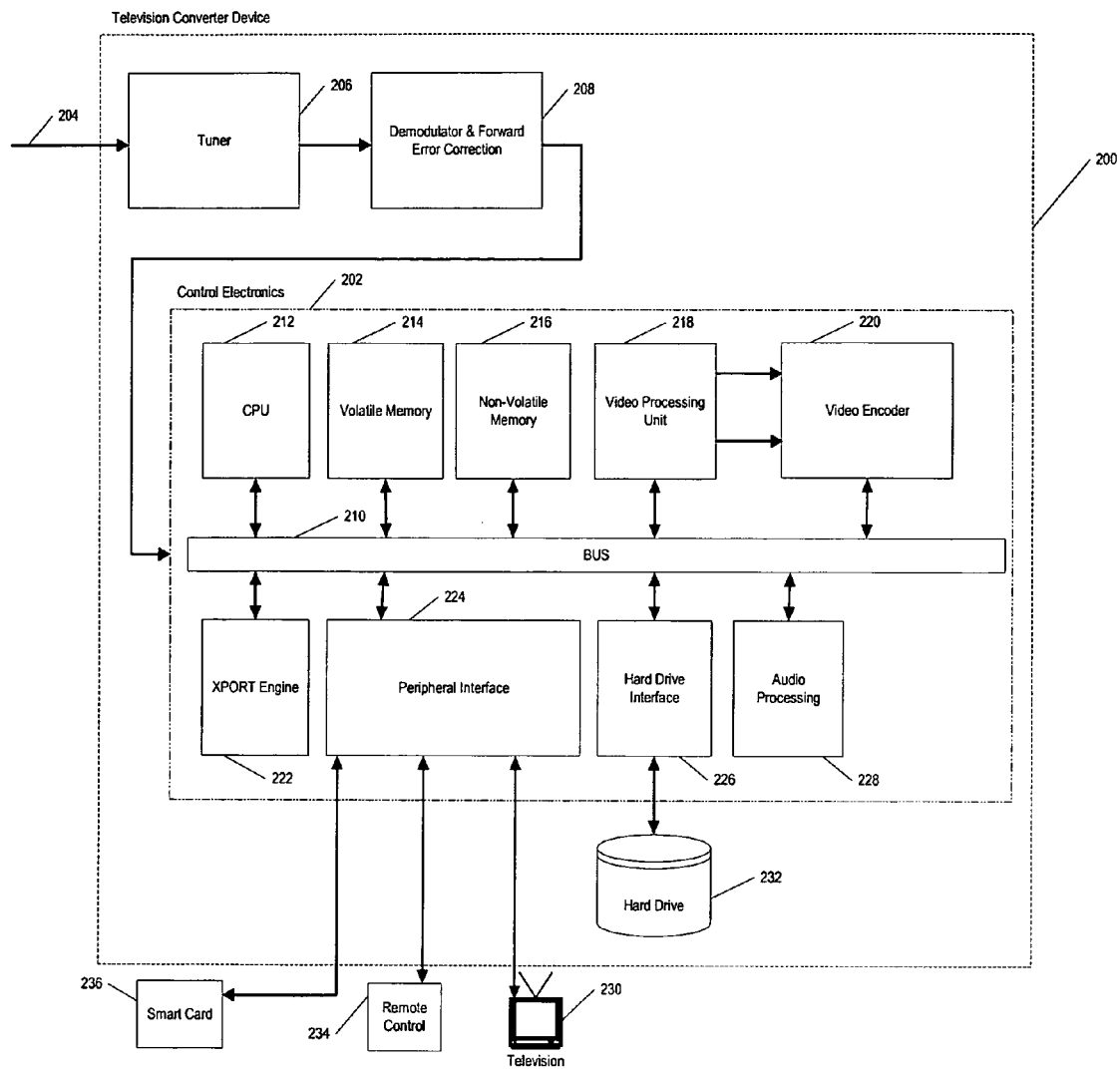
FIG. 2 is a high level block diagram of a television converter of an embodiment of the present invention.

FIG. 2 provides a high level block diagram for the satellite television converter device 100, 200 with DVR functionality in accordance with the present invention.

The signal 110, 204 that arrives at the satellite set top box 200 may undergo extensive processing. The television converter 200 may include one or more tuner devices 206 that may receive a satellite signal 204. In this embodiment, tuner device 206 acquires a satellite signal 204 from satellite television distributor 104. Tuner device 206 may initially process the satellite signal 204. Tuner device 206 may also receive subscriber commands in the form of signals from control electronics unit 202. Signals from control electronics unit 202 may include, but is not limited to, a signal to tune to a transponder as part of the process of selecting a certain channel for viewing on a peripheral device. One skilled in the art would recognize that the tuner device 206 may include fewer, more, or different components.

After receiving the signal 204, one of the first steps may be to demodulate 208 the signal 204. The signal 204 may arrive as an analog signal that "carries" data (e.g., data is modulated onto the analog signal). Demodulation 208 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 204 may be possible. Another one of the first steps may also be to error check 208 signal 204. One example of error checking 208 is forward error checking (FEC). FEC 208 may include, but is not limited to, inspecting parity bit or bits that may accompany signal 204. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein.

In this embodiment, satellite set-top-box 200 contains control electronics unit 202 that receives satellite signal 204. One skilled in the art will recognize that control electronics 202 may receive other signals, including, but not limited to, signals from a cable or broadcast television distributor. One example of a control electronics unit 202 is the STMicroelectronics STi5517 Low-Cost Interactive Set-top Box Decoder, Part No. 7424736A. In a preferred embodiment, control electronics unit 202 includes discrete electronic components combined into a single circuit with a shared bus 210. In other embodiments, control electronics unit 202 may be configured differently. For example, one or more of the control electronics unit 202 components in set-top-box 200 may be combined or omitted. The control electronics unit 202 may use a custom ASIC, such as from the LSILogic G11 family, or FPGA, such as from the Altera Stratix™ family. As a further example, one or more of the control electronics unit 202 components in set-top-box 200 may not share a bus 210, but may nonetheless be operatively connected by some other means. One skilled in the art will recognize that other configurations of set-top-box 200 and control electronics unit 202 are possible and within the scope of this invention. One skilled in the art will further recognize that some components of set-top-box 200 and control electronics unit 202 may be implemented in hardware or software. The control electronics unit 202 may operate under the control of a software program, firmware program, or some other program stored in memory or control logic. One skilled in the art will also recognize that the control electronics unit 202 may include other electronic components or structures to mediate or process signals.

Control electronics unit 202 may contain one or more central-processing-units (CPUS) 212 or processors. A preferred embodiment of control electronics unit 202 contains a single CPU 212 that is operatively connected to the shared bus. In one embodiment, CPU 212 may be used, among other things, for logical operations for set-top-box 200 functions including, but not limited to, channel selection, recording control, EPG display and control and system maintenance. Examples of commercially available CPUs 212 include the STMicroelectronics Enhanced ST20 32-bit VL-RISC, Motorola 68000 or Intel Pentium processors. One skilled in the art will recognize that the CPU 212 may be integrated with memory or other discrete electronics components.

Control electronics unit 202 may also contain one or more volatile memory components 214. Volatile memory components 214 may include, but are not limited to, one or more SDRAM memory chips. Similarly, control electronics unit 202 may contain non-volatile memory components 216. Non-volatile memory 216 may include one or more memory chips, including, but not limited to, ROM, SRAM, SDRAM and Flash ROM. One skilled in the art will recognize that volatile memory 214 and non-volatile memory 216 may be integrated within other electronics components. One skilled in the art will also recognize that other memory components may be included within set-top-box 200 and control electronics unit 202. One skilled in the art will recognize that memory 214, 216 may be used for many purposes, including, but not limited to, storing EPG data and storing data for use by CPU 212.

In a preferred embodiment, signal 204 is in digital form (e.g., a digital stream) after demodulation and error correction. For example, digital stream 204 may use, but is not limited to using, the digital video broadcasting (DVB) transport standard. The digital stream 204 may be multiplexed and therefore require demultiplexing by XPORT Engine 222. Demultiplexing 222, or demuxing, may include separating the bits of data into separate digital data streams. The digital streams may be packetized. Thus, the multiplexing of the separate digital data streams may not be bit-by-bit but packet-by-packet. The packet size may vary or may be constant. After demuxing 222 the packets, the separate digital data streams may be reassembled by placing related packets together in a continuous data stream 204.

Each of the separate digital data streams may also be encoded. Encoding is a method for representing data. Encoding may allow the data to be compressed. Compression can provide the system with increased bandwidth. One skilled in the art will recognize that several different encoding formats are possible. In satellite television, encoding formats may include the MPEG or MPEG2 standards. Beyond the raw data, the separate digital data streams may include forward error correction, headers, checksums, or other information. All of this different information may be included in the digital television signal 204 processed by the satellite set-top-box 100. Control electronics unit 202 may therefore include one or more video processing units 218 that, among other video processing operations, may decode encoded signal 204. In a preferred embodiment, video processing unit 218 may include, but is not limited to, a graphics processor, MPEG-2 decoder and a display compositor with separate on-screen display (OSD) control for peripheral devices. One skilled in the art will recognize that video processing unit 218 may also include other electronics, including, but not limited to, alpha blending, antialiasing, antiflutter and antiflicker filters, memory and video-rendering components.

Another discrete electronic component of control electronics unit 202 may be a video encoder unit 220. Video encoder unit 220 may work in combination with or independently from video processing unit 218. Video encoding unit 220 may encode digital stream 204 for output to one or more peripheral devices, including, but not limited to, a television. For example, video encoding unit 220 may encode digital stream 204 for RGB, CVBS, Y/C and YUV outputs. Encoding may allow program data to be compressed. As a preferred embodiment, video encoder 220 may translate digital stream into a signal using the NTSC, PAL or SECAM standards. One skilled in the art will recognize that video encoder unit 220 may include other functionality, may be integrated into other electronic components of satellite set-top-box 200, and may encode digital stream 204 using other standards, including, but not limited to, MPEG and MPEG2.

Control electronics unit 202 may also include one or more hard drive interfaces 226 and hard drives 232. In a preferred embodiment, television converter device 200 contains one hard drive interface 226 and hard drive 232. Hard drive 232 may be used for many purposes, including, but not limited to, storing recorded programs, buffering currently-playing programs (e.g., buffering a program may allow a user to pause or rewind a program), storing EPG data, storing commands or functions for the control electronics unit 202, storing timers or record events, and storing data for other devices within or connected to the satellite set-top-box 200. As another example, hard drive 232 may be used to temporarily store data for processing by CPU 212. In this example, the hard drive 232 may allow the processor 212 to separate EPG data arriving as part of digital stream 208. One skilled in the art will recognize that other storage devices and interfaces may be substituted for hard drive interface 226 and hard drive 232 and are within the scope of this invention. One skilled in the art will also recognize that hard drive interface 226 and hard drive 232 may separately or together include an integrated memory (e.g., a memory buffer, commonly known referred to as cache) and additional processing components or logic. One skilled in the art will also recognize that hard drive interface 226 may be integrated into peripheral interface 224 (described below). Finally, one skilled in the art will recognize that hard drive 232 may be external and connected to satellite set-top-box 200. For example, an external hard drive 232 may be connected to satellite set-top-box 200 using USB 2.0 or IEEE 1394 (FireWire) connections. Such an external hard drive may include a screen for portable viewing of programming stored on it.

An audio processing unit 228 may also be part of the control electronics unit 202. Audio processing unit 228 may decode the digital stream 204 for output to peripheral devices, including, but not limited to, a stereo, television speakers or portable audio or video players. For example, audio processing unit 228 may decode MPEG-1 layers I/II and layer III, Dolby Digital, Dolby ProLogic, SRS/TruSurround encoded audio in digital stream 204. Audio processing unit 228 may include one or more processors, memory components or digital to audio converter (DAC) systems. One skilled in the art will recognize that other audio processing components and functionality may be accomplished using audio processing unit 228.

A satellite set-top-box 200 may be connected to one or more peripheral electronic devices through peripheral interface 224. These peripheral devices may include a stereo (not shown), television 230, smart card 236, VCR (not shown), or other devices. In a preferred embodiment, home entertainment system 102 minimally contains, but is not limited to, a television 230 and smart card 236. Television 230 may serve many purposes, including, but not limited to, displaying television programming, displaying the EPG, displaying timer conflicts, and displaying other types of data, graphics and programming. Peripheral devices may receive and/or send signals from the satellite set-top-box 200. For instance, the television 230 may receive video and audio signals and a stereo may receive only audio signals. A camcorder (not shown), on the other hand, may send video or audio signals to the satellite set-top-box 100 or receive audio and video signals from the set-top-box to record. As another example, peripheral interface 224 may include a processor or other electronic components to permit an interface to content security devices such as an external "smart card." In this example, peripheral interface 224 may then encrypt or decrypt content for output to other peripheral devices. Thus, peripheral interface 224 may perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices may include many types of commercially available electronic devices.

The home entertainment system 102 may also include a remote control 126, 234 peripheral device, also sometimes referred to as a remote. The remote control 234 may be used to send commands to the satellite set-top-box 200. The remote control 234 may send commands via a wireless connection using, for example, infrared or UHF transmitters within the remote control 234. One example of an embodiment of a remote controller 234 is the EchoStar Technologies Corporation 721 Platinum Plus Remote, Part Number 121150, that includes an IR transmitter and an ultra high frequency (UHF) transmitter. The remote control 234 may be able to send signals to other peripheral electronic devices that form part of the home entertainment system 102, including, but not limited to, a television, stereo, VCR, or DVD player. The set-top-box 200 may also be able to send signals to the remote control 234, including, but not limited to, signals to configure the remote control 234 to operate other peripheral devices in home entertainment system 102. In some embodiments, the remote control 234 has a set of Light Emitting Diodes (LEDs). Some remote controls may include Liquid Crystal Displays (LCDs) or other screens. The remote control may include buttons, dials, or other man-machine interfaces. While the remote control 234 may often be the common means for a subscriber to communicate with the satellite set-top-box 200, one skilled in the art will recognize that other means of communicating with the set-top-box 200 are available, including, but not limited to attached keyboards, front panel buttons or touch screens.

The satellite set-top-box 200 may also include a remote control interface (not shown). A remote control interface may include any means for the user to communicate to the satellite set-top-box 200, and may be implemented using the peripheral interface 224 of control electronics unit 202 or by connecting a peripheral remote control interface device. In a preferred embodiment, a remote control interface may receive commands from one or more different remote controls 234. Remote control 234 may use infrared, UHF, or other communications technology. The remote control interface may therefore translate an input from the user into a format understandable by the control electronics unit 202. The translation systems may include, but are not limited to, electronic receivers and electronic relays. One skilled in the art will recognize that other means to receive and translate user inputs are possible.

Another peripheral device and connection to the satellite set-top-box 200 may include a phone line (not shown) and modem (not shown). Set-top-box 200 may use a modem and phone line to communicate with one or more outside entities or systems (e.g., satellite television distributor 104). The phone line may carry local or long-distance telephone service. One skilled in the art will recognize that the phone line may also carry other services, including, but not limited to, DSL service. These communications may include requesting pay-per-view programming, reporting of purchases (for example, pay-per-view purchases), obtaining updates to subscriber programming (e.g., updating EPG data), or receiving updates to software on the satellite set-top-box 100. For example, the phone line may communicate with the satellite set-top-box 100 using an RJ-11 style telephone connection. One skilled in the art will recognize that there are many other uses for this phone line connection. For example, EPG data may be transmitted to set-top-box 200 via phone line or in the satellite signal 204. One skilled in the art will recognize that the EPG data may be transmitted to set-top-box 200 by various other methods, systems and outside entities. Also, one skilled in the art will recognize that a phone line connection to satellite distributor 104 may represent other communication connections, including, but not limited to, wireless, Internet, or microwave communications connections. Another function of the phone line may be to periodically receive the EPG data.

As set forth in the following embodiments and FIG. 3, a satellite television distributor 104 may create a service to remotely record programs for a user. For example, programs recorded by this service may include, but are not limited to, programs chosen by a satellite television distributor 104, newly released movies, recurring programs, popular programs (e.g., programs chosen based upon viewer tracking data such as Nielson ratings), programs associated with a theme or keyword, or one or more programs that are requested by a subscriber. In one embodiment, a remote recording service may require a subscriber to enroll. In a second embodiment, a remote recording service may occur automatically without the user's knowledge. In a third embodiment, a remote recording service may set recording timers based upon the historical selection of previously requested recording timers by a subscriber. In a fourth embodiment, the user may opt out of the remote recording service. In a fifth embodiment, a remote recording service may record programs upon the first release or transmission of the program.

Figure 3:
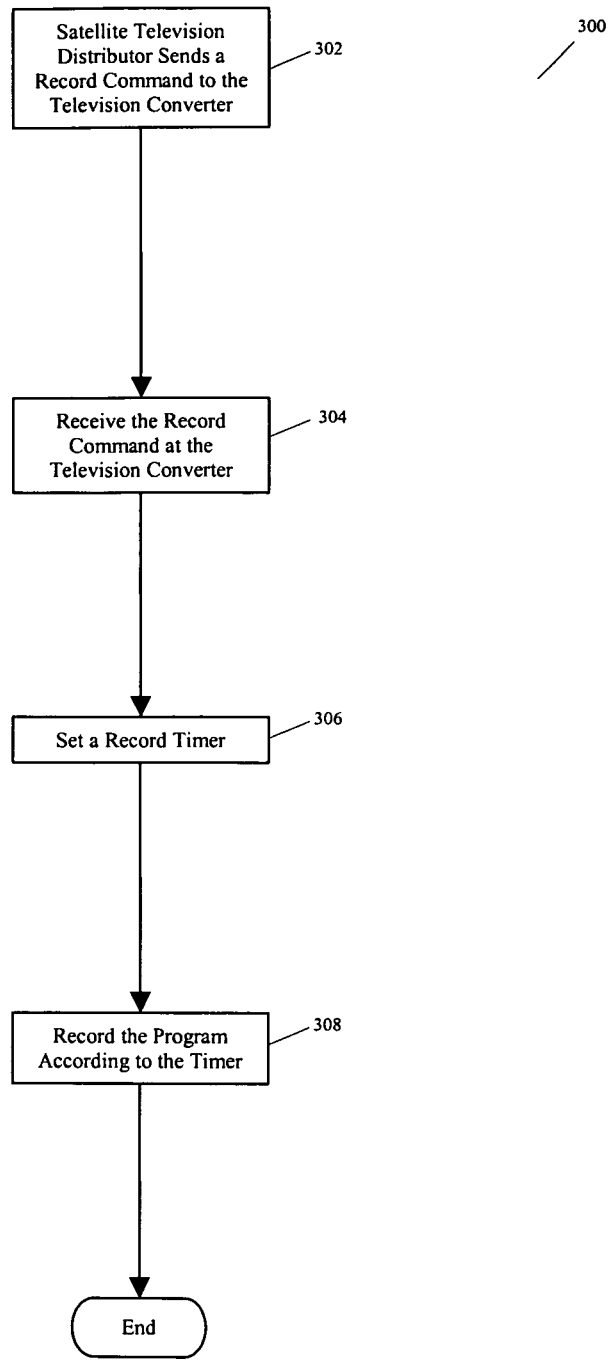
FIG. 3 is a flow diagram illustrating a method for the satellite television distributor to create recording timers.

FIG. 3 shows one embodiment of a method 300 for a satellite distributor 104 to remotely set recording timers. In this embodiment, a satellite television distributor 104 may send 302 one or more record commands to the subscriber's television converter 100. There are various communications pathways that may be used to send the record command. One of the pathways may include the satellite television distributor 104 sending the command via the phone line 112. The phone line connection 112, 240 may relay the command to the control electronics 202 in the television converter 100, 200. This communications pathway may allow the record command to be personalized for each subscriber. In one embodiment, the broadcast of the recording command may be sent via cablecast through a cable system. As a preferred embodiment for satellite television distributors 104, another pathway for sending record commands may be by mass broadcast of record commands via the satellite 106. This mass broadcast by the satellite television distributor 104 may entail uplinking a record command to a satellite 106 (e.g., uplinking to a direct broadcast satellite) and then broadcasting the record command to all subscribers. In a preferred embodiment, the satellite television distributor 104 may command recording of the same program for all subscribers. One skilled in the art will recognize that the sending of subscriber-specific recording commands may depend upon the choice of the communications pathway. In the preferred embodiment, satellite 106 may relay recording commands to the subscriber's satellite communications device 108. Once received at the satellite communications device 108, a record command may then be forwarded to the satellite set-top-box 100, 200. Regardless of the pathway used, the recording command may be received 304 by the television converter 100.

In a preferred embodiment, the relaying of recording commands to satellite 106 may entail identifying the user or user's television converter 100. For example, the serial number of the set-top-box or the user's account information may be used to identify the user. As another example, a user may be identified by supplying a user name and password. The recording command may then select and associate a program or programs to be recorded (e.g., a program chosen by the satellite television distributor 104) with the user. In one embodiment, selection of a program may require translating a program identification code for a given program. In this preferred embodiment, the associated program or programs and user information may then be sent to a headend of a satellite television distributor 104. A headend may include, but is not limited to, a satellite uplink center of a satellite television distributor 104. The information identifying the user or the user's television converter 100 may then be used to create a unique identification code that is associated with the user's television converter. In this embodiment, the unique identification code may then be associated with the recoding command to be sent by the satellite distributor 104.

As set forth previously, the satellite television distributor 104 may choose a pathway to transmit the recording command to the user. Upon receiving the record command 304, the television converter 100 may set 306 a record timer. In a preferred embodiment, setting the record command may entail comparing the unique identification code sent by the satellite television distributor 104 to some information stored in the television converter 100. This comparison may be necessary to ensure that the user's television converter 100 is the intended television converter to receive the record command. In one embodiment, a recording command that is not addressed to the user's television converter 100 may be ignored by the television converter. To set 306 the timer, the control electronics 202 may create and store the timer. The timer may be updated periodically with EPG data sent to the control electronics 214. The timer may be a data record or some type of clock. Information included in the timer may include, but is not limited to, the program name, the channel, the time the program starts, the duration of the program, or the description of the program. Once stored, the control electronics 202 may retrieve the timer at any time to update the timer or execute it.

At some time in the future, the control electronics 202 may execute the timer to record 308 a program. To record a program 308, the control electronics 202 may retrieve the timer. Upon reading the timer, the control electronics 202 may send one or more commands, including, but not limited to, commands for processing the incoming signal 110, extracting the program to be recorded, and recording the program.

The user may decide to view the program. To view the program, the subscriber may send a command to the television converter 100 by the remote control 126. The command may be received by the control electronics 202. The control electronics 202 may then display the program on television 120.

In another embodiment, the user's television converter 100 may transmit (e.g., via the internet or using a modem) information to a server of the satellite television distributor 104 that indicates whether a recording timer was set. This information sent to the satellite television distributor's server may also be made accessible, for example, by the internet. One skilled in the art will recognize that many ways of accessing information sent to a pay television distributor are possible.

Figure 4:
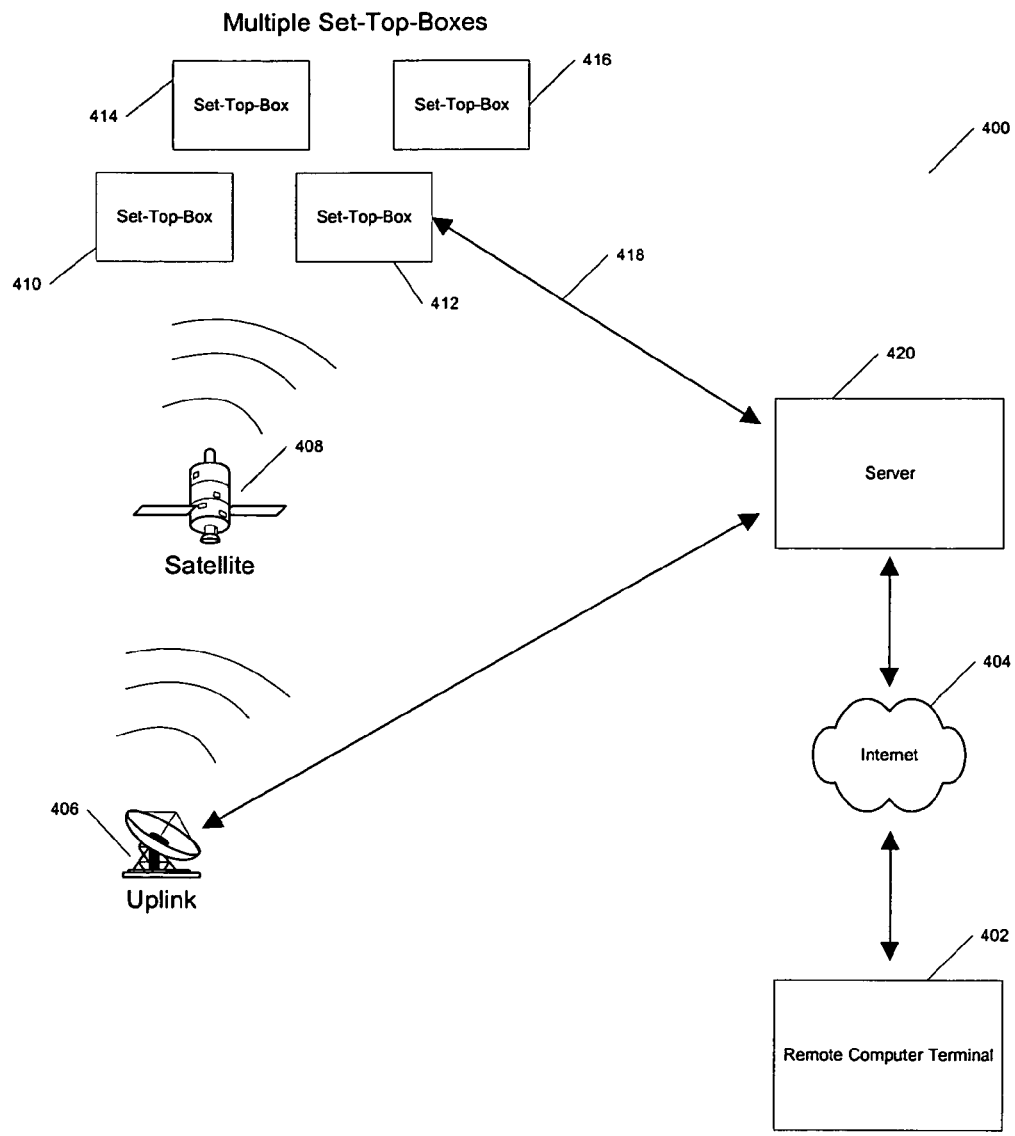
FIG. 4 is high level block diagram of one embodiment of a system for remotely setting timers.

FIG. 4 shows one embodiment of the invention wherein the user remotely sets a recording timer. In this embodiment, the user is a subscriber to a satellite television provider, although one skilled in the art can see that the concept applies equally to cable and other television distribution systems.

The user can scan program listings on remote computer terminal 402. The computer listings may be provided by the satellite television distributor, for example by server 420, via world wide web access or other means. The user can sign on to the web site provided by the satellite television distributor by entering a user name and password. In this way, the satellite television distributor can identify which customer is requesting a recording. When the user finds a desired program the user can select it for recording. The requested program for recording is associated with the user and forwarded to an uplink center 406 of the satellite television provider.

At the uplink center 406, the satellite television distributor can utilize the user name and password to look up a unique identification code associated with the user's DVR device. This process can also be preformed by server 420. This code, along with the code for the program selected by the user for programming, can then be uplinked to satellite 408 for broadcast to a plurality of DVR devices. It should be noted that the information identifying the program selected by the user may be in the form of a unique code associated with each program scheduled to be broadcast by the satellite television provider over a given period. Such codes are commonly referred to as program identification codes. The program identification code, together with the code identifying the user's DVR device, along with any other associated codes that are needed to implement the recording (i.e. one time record, weekly record, priority record, protected record etc.), may collectively be referred to as a recording command.

The recording command can then be broadcast by satellite 408 to set top boxes such as 410, 412, 414 and 416, many of which may be DVR devices. Each of the set top boxes can then compare the unique identification code associated with the user's DVR device to determine if they are the device that should be implementing the recording command. The set top box that has the corresponding unique identification code, in this instance set top box 412 which is a DVR box, implements the recording command by setting a timer for the program the user has selected for recording.

Set top box 412 can then report that it has implemented the timer to server 420. The user may access server 420 via the internet 404 or other means to see that the requested timer has been implemented.

It will be clear that the present invention is well adapted to attain the ends and advantages mentioned as well as those inherent therein. While a presently preferred embodiment in the form of a satellite set-top-box has been described for purposes of this disclosure, various changes and modifications may be made which are well within the scope of the present invention. For example, a service for remotely record programs may send record commands for programs that are historically popular, including, but not limited to, the Super Bowl. Numerous other changes may be made which will readily suggest themselves to those skilled in the art and which are encompassed in the spirit of the invention disclosed and as defined in the appended claims.

We claim:

1. A method of remotely commanding a user's DVR device to record a television program, the method comprising:
    selecting, by a server associated with a television distributor, a program to be recorded for a user who is a subscriber to a television service provided by the television distributor, the program not having been previously selected by the user for recording;
    identifying a DVR device associated with the user, the DVR device operable to record the program selected by the television distributor, the DVR device-not connected to communicate directly with the server;
    transmitting, to a headend, information identifying the program to be recorded and at least one of information identifying the DVR device and information identifying the user;
    translating, at the headend, at least one of the information identifying the user and the DVR device into a unique identification code associated with the DVR device;
    generating, at the headend, a recording command based on the unique identification code and information identifying the program; and
    broadcasting the recording command from the headend to the DVR device and to a plurality of other DVR devices, the DVR device matching the unique identification code to a stored code to thereby store the recording command and execute the recording command at a time associated with the program to store content associated with the program, the other DVR devices not matching the unique identification code to a stored code and taking no action responsive to the recording command.

2. A method of remotely commanding a user's DVR device to record a television program according to claim 1 further comprising broadcasting said recording command.

3. A method of remotely commanding a user's DVR device to record a television program according to claim to claim 2 wherein the step of broadcasting includes uplinking said multiplexed recording command to a satellite and broadcasting said recording command by direct broadcast satellite.

4. A method of remotely commanding a user's DVR device to record a television program according to claim 2 further comprising broadcasting said record command by cablecast through a cable system.

5. A method of remotely commanding a user's DVR device to record a television program according to claim 3 further comprising receiving said broadcast recording command at a DVR device and comparing the unique identification code to information stored in the DVR device to determine if the recording command is addressed to that DVR device.

6. A method of remotely commanding a user's DVR device to record a television program according to claim 5 further comprising setting a recording timer for the program to be recorded if the recording command is addressed to that DVR device.

7. A method of remotely commanding a user's DVR device to record a television program according to claim 6 further comprising transmitting from said DVR device to a remote server information indicating that the timer has been set.

8. A method of remotely commanding a user's DVR device to record a television program according to claim 6 further comprising transmitting via the internet.

9. A method of remotely commanding a user's DVR device to record a television program according to claim 6 further comprising transmitting using a modem.

10. A method of remotely commanding a user's DVR device to record a television program according to claim 7 further comprising accessing from said server said information indicating that the timer has been set.

11. A method of remotely commanding a user's DVR device to record a television program according to claim 10 wherein said information indicating that the timer has been set is accessed via the internet.

12. A method of remotely commanding a user's DVR device to record a television program according to claim 1 further comprising translating a program identification code.

13. A method of remotely commanding a user's DVR device to record a television program according to claim 1 further comprising a headend that is a satellite uplink center.

14. A method of remotely commanding a user's DVR device to record a television program according to claim 1 further comprising a user name and password being information that identifies the user.

15. A method to record programs on a television converter for a subscriber to a pay television service, compromising:
    a. sending a command from a pay television distributor to the television converter, wherein the command requires a recording timer to be set;
    b. setting the recording timer in the television converter
    c. recording a program according to the recording timer;
    d. providing the recorded program to the subscriber.

16. A method according to claim 15, wherein the recording timer is set for a recurring program.

17. A method according to claim 16, wherein the recording timer is set for before each episode or the recurring program.

18. A method according to claim 15, wherein the subscriber can choose for the pay television distributor to not set the recording timer.

19. A method according to claim 15, wherein the subscriber requests that the pay television distributor set the recording timer.

20. A method according to claim 19, wherein the subscriber requests a plurality of programs to be recorded by the pay television distributor.

21. A method according to claim 20, wherein the plurality of shows to be recorded are derived from a plurality of themes chosen by the subscriber.

22. A method according to claim 15, wherein the pay television distributor determines which program to record.

23. A method according to claim 22, wherein the program selected by the pay television distributor is a newly released movie that is anticipated to be in great demand.

24. A method according to claim 22, wherein the program selected by the pay television distributor matches a historical pattern of previously requested programs selected by the subscriber.

25. A method according to claim 22, wherein the program selected by the pay television distributor is watched by a large number of consumers according to viewer tracking data.

26. A method according to claim 22, wherein the viewer tracking data are the Nielson ratings.

27. A television converter for setting a recording timer for a television program, comprising:
   a. a first memory, wherein the first memory stores the television program;
   b. a second memory, wherein the second memory stores the recording timer;
   c. a phone line connection, wherein the phone line connection receives a command from a pay television distributor to set a recording timer for the television program;
   d. a processor coupled in communication to the first memory, the second memory, and the phone line connection, wherein the processor receives the command, sets the recording timer, stores the timer in the second memory, and executes the recording timer by commanding the first memory to record the television program.

* * * * *